(12) United States Patent
Cook

(10) Patent No.: US 7,381,878 B2
(45) Date of Patent: Jun. 3, 2008

(54) MUSICAL INSTRUMENT DISPLAY

(76) Inventor: Randy Mitchell Cook, 6227-A Kawaihae Pl., Honolulu, HI (US) 96825

( * ) Notice: Subject to any disclaimer, the term of this patent is extended or adjusted under 35 U.S.C. 154(b) by 0 days.

(21) Appl. No.: 11/508,588

(22) Filed: Aug. 22, 2006

(65) Prior Publication Data

US 2006/0278062 A1    Dec. 14, 2006

Related U.S. Application Data

(63) Continuation-in-part of application No. 10/846,885, filed on May 17, 2004, now abandoned.

(51) Int. Cl.
*A63J 17/00* (2006.01)
*G10D 1/08* (2006.01)
*G10D 3/04* (2006.01)
*G10D 3/06* (2006.01)

(52) U.S. Cl. .................................. 84/464 A; 84/314 R

(58) Field of Classification Search .............. 84/314 R, 84/464 R, 464 A
See application file for complete search history.

(56) References Cited

U.S. PATENT DOCUMENTS

| | | | |
|---|---|---|---|
| 4,318,327 A | 3/1982 | Toups | |
| 4,915,005 A | 4/1990 | Shaffer et al. | |
| 5,266,735 A | 11/1993 | Shaffer et al. | |
| 5,408,914 A | 4/1995 | Breitweiser, Jr. et al. | |
| 6,337,433 B1 * | 1/2002 | Nishimoto | 84/464 A |
| 6,452,081 B1 | 9/2002 | Ravagni et al. | |
| 6,781,049 B2 | 8/2004 | Taylor | |

OTHER PUBLICATIONS

Mulhern, Tom "Product Profiles-Optek Fretlight FG-100 Guitar," Guitar Player/Jan. 1990, p. 134.
Yamaha Corporation of America, "EZ-EG Guitar" updated Apr. 3, 2003.
Optek Music Systems, "Introducing the 2005 Fretlight Guitar".

* cited by examiner

*Primary Examiner*—Jeffrey Donels
(74) *Attorney, Agent, or Firm*—Martin E. Hsia

(57) ABSTRACT

A visual display mounted on a musical instrument for use as a teaching aid, for teaching fingerings and chords, a performing aid for displaying information relevant to a user's performance, and a visual effects aid, for displaying visual effects to an audience while a user is performing.

15 Claims, 7 Drawing Sheets

MUSICAL INSTRUMENT DISPLAY

This application is a continuation in part of U.S. patent application Ser. No. 10/846,885 filed May 17, 2004 now abandoned.

TECHNICAL FIELD

This invention relates to a musical instrument display, preferably for a musical instrument having a plurality of strings and a fingerboard whereby a user creates different notes by engaging the strings at varying finger positions on the fingerboard.

On a conventional stringed musical instrument, a neck is attached to a body, strings are attached to the body at one end, and the strings extend over a bridge, across the body and the neck, and then over a nut and to tuning pegs. The portion of the strings between the bridge and the nut is therefore free to vibrate. Conventionally, a portion of the neck is used as a fingerboard and a user can change the note played by a string by engaging the string at the fingerboard. In a fretted instrument, such as a guitar, the user usually engages the string behind a selected fret (that is, on the side of the fret farthest from the bridge) so that the portion of the string between the fret and the bridge is free to vibrate, and the user then vibrates the portion of the string between the fret and the bridge, usually by plucking or strumming. In a fretless instrument, such as violin, the user's finger presses the string against the fingerboard directly so that the portion of the string between the bridge and the user's finger is free to vibrate.

In order to learn how to play a stringed instrument, a user must learn the appropriate finger positions on the fingerboard for playing specific notes or chords. Further, the notes or chords and desired positions on the fingerboard may vary depending on the tension in the string (such as with "odd" or "slack key" tuning) or other positions may be desired to be indicated to achieve other musical effects, such as harmonics. However, merely indicating positions on a fingerboard is not adequate for persons learning the musical instrument because the user will not be able to determine which note or chord is being played by merely looking at the fingerboard. Further, it may be necessary or desirable to display information other than finger positions on a fingerboard or, indeed, on the body of the entire instrument, such as lyrics, text, graphics, or movies. Also, positions sometimes must be indicated in addition to finger positions. For example, to play harmonics, a string must be touched lightly (damped) at a particular position (a "node") which may or may not coincide with a finger position. For another example, in order to play certain special effects, strings must be strummed, plucked or bowed at particular positions that may not coincide with finger positions.

BACKGROUND ART

U.S. Pat. No. 5,408,914 to Breitweiser, Jr., et al. (incorporated herein by reference) discloses a musical instrument training system for a stringed musical instrument with fingering and playing displays comprising arrays of multiple LEDs and LCDs embedded in the fingerboard at fixed locations. A notepad display is also embedded in the body for displaying alpha-numeric playing instructions.

U.S. Pat. No. 5,266,735 to Shaffer, et al. (incorporated herein by reference) discloses a stringed musical instrument having a plurality of individual annunciators for dynamically indicating a location for engaging the musical instrument to produce a note.

U.S. Pat. No. 4,915,005 to Shaffer, et al. (incorporated herein by reference) discloses a fingering display for a musical instrument that includes a number of electrical switches manually operable to designate a desired musical note and subdisplays showing all the possible fingering positions for all the notes of the scale or chord.

U.S. Pat. No. 4,318,327 to Toups (incorporated herein by reference) discloses a digital chord display for stringed musical instruments that provides a real time alpha-numeric display of notes and chords being played.

An article entitled "OPTEK FRET LIGHT FG-100 GUITAR" on pages 134-135 of the January 1990 issue of "Guitar Player" magazine (incorporated herein by reference) discloses a teaching guitar having LEDs inlaid into the fingerboard to indicate selected notes and chords.

However, none of the prior art devices provides a single display capable of indicating positions other than positions for conventional notes and chords on conventionally tuned instruments, and none of such devices provides for display of visual graphic or other non-alphanumeric information on portions or the entirety of the fingerboard, or body, of the instrument.

Graphic displays on the fingerboard or body of stringed instruments are especially desirable because such instruments are not fixed in place, as conventional keyboard instruments are, so that the user can present the display of the musical instrument to the audience while still playing the instrument, and also because stringed instruments can be made in varying sizes and shapes because the musical notes created by such instruments are determined by the tension in the strings instead of the shape and size of the body, as would be the case with woodwind, brass and percussion instruments. Visual displays on large musical instruments that are not moved during performance, such as pianos or stringed bass, also are within the scope of this invention.

Of course, this invention can also be used on instruments that do not use physical strings but that use the same fingering techniques as stringed musical instruments, such as finger-actuated synthesizers having a fingerboard, where the sound is generated by an audio oscillator instead of strings. Indeed, this instrument can also be used on portable or movable keyboard instruments that are held and moved by the player while performing.

DISCLOSURE OF INVENTION

This invention comprises a musical instrument having a body, a fingerboard attached to the body, with strings attached to the body and to the fingerboard and engaged by the fingers of a user to create musical notes, where there is a display extending over the fingerboard and the display is capable of simultaneously selectively identifying which of a user's fingers are to be placed at finger positions to achieve a desired musical effect, and indicating information about the desired musical effect. A control circuit is connected to the display for receiving input signals and for controlling the display in response to the input signals. An entry device can interface with the control circuit to cause the display to show, for example, tablature for chords or scales or songs. The entry device could be wired or wireless, and could have, for example, buttons for specifying chord names, scale names, or chord progressions for songs.

Preferably, the display is dynamic (that is, can change with time), polychromatic (that is, can display multiple colors), and comprises a liquid crystal display. Preferably, each note is assigned a different color, so that the same note in each octave is assigned the same color, so the user can more easily discern, absorb and retain note positions and the harmonic relations between notes and chords. Preferably, a transparent cover is placed over the display. The display could indicate musical effects such as chord names, note names, harmonics, plucking force, bowing force, and alternate fingerings. Further, the display can also present graphics, text, and other visual information to either the user or an audience.

Because the dynamic display is not limited to specific positions on the fingerboard or body, and can display more than alphanumeric information, the display can show positions other than finger positions for conventional notes and chords, and more than just the names of those notes and chords. For example, the display can show finger positions for touching a string to create harmonics. In addition, the display can show fingering information for odd or unconventional tunings where the strings of the instrument are not tuned to the conventional "open notes" (notes when no finger engages a string). Also, for fretted or unfretted instruments, the display can show finger positions for quarter tones or other unconventional special effects.

Separate from and in addition to usefulness as a teaching aid, the display can extend over a portion of the body and be used as a performing aid, to show the user the lyrics of a song or other information relevant to a performance, such as the printed music that is to be played.

Separate and apart from its usefulness as a teaching aid and a performing aid, the display can also extend over a portion of the body and be used to show graphic information to an audience, such as still or moving pictures relevant to the music being performed.

BRIEF DESCRIPTION AND DRAWINGS

BEST MODES FOR CARRYING OUT INVENTION

The presently preferred best modes for carrying out the present invention are illustrated by way of example in FIGS. 1-7.

Figure 1:
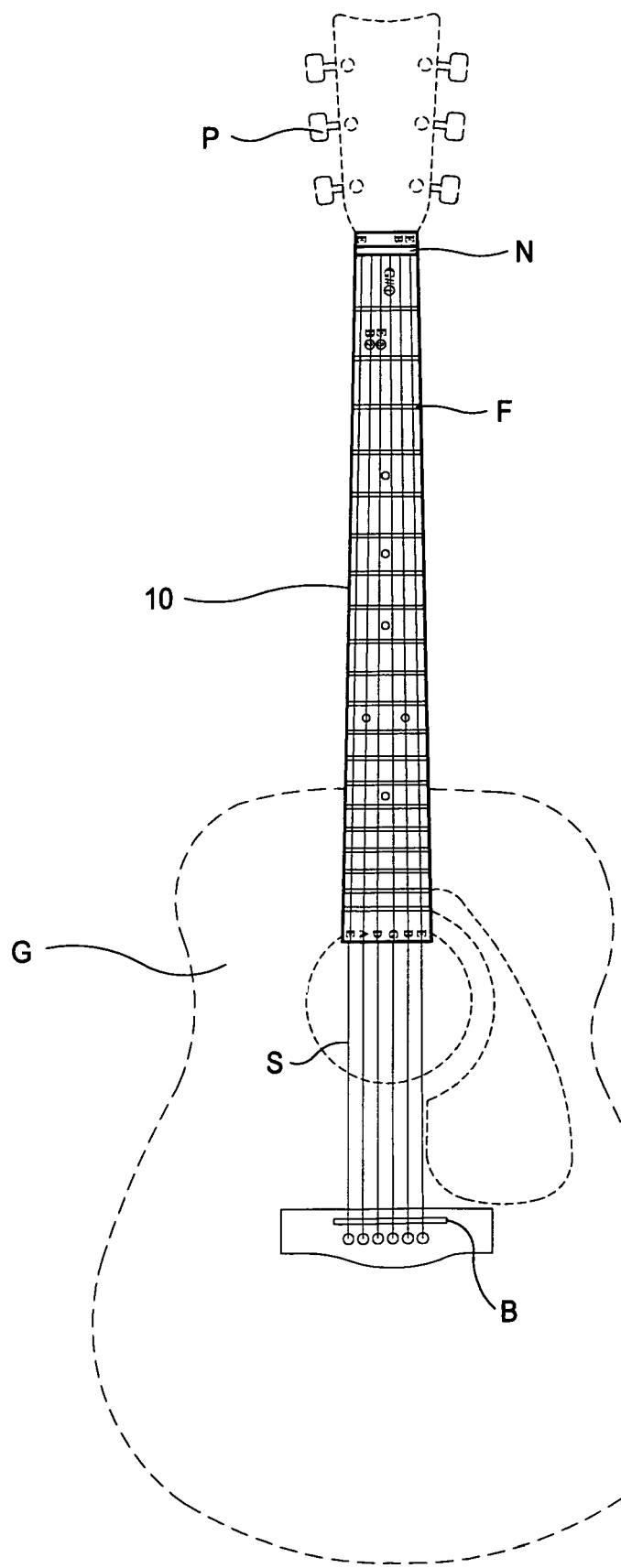
FIG. 1 is a front view of a presently preferred embodiment of the present invention mounted on the neck of a conventional guitar.

Referring to FIG. 1, shown as the first preferred embodiment of a display 10 mounted on the neck (not shown, but behind the display 10) of a conventional guitar G. The strings of the guitar S are anchored at one end to the body of the guitar G and stretched over the bridge B, extend along the neck to the nut N and then to the pegs P. Thus, the string between the bridge B and the nut N is free to vibrate, as is conventional. Frets F are provided on the neck of the guitar G and may be mounted over the display 10.

Figure 2:
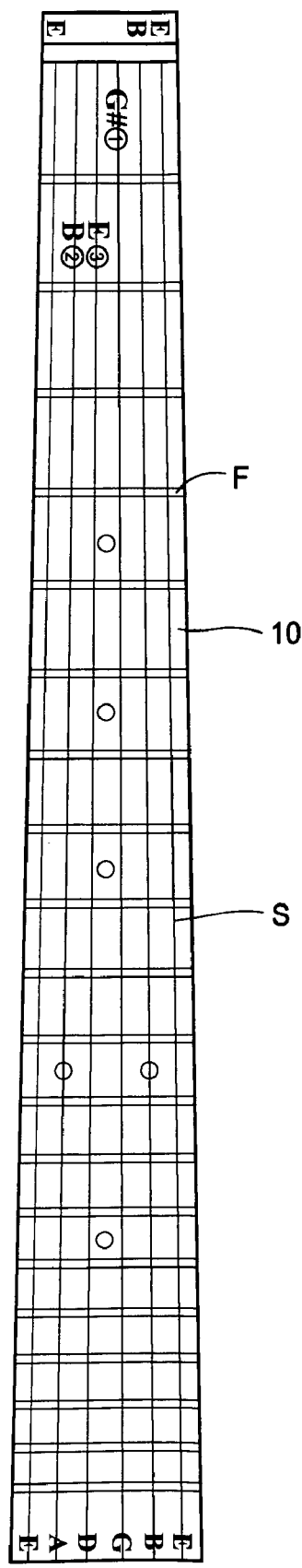
FIG. 2 is a front view of the display of FIG. 1.

Referring to FIG. 2, shown is display 10 with the strings S stretched across and above the fingerboard. Preferably, the display 10 is mounted on the neck and then a transparent cover (not shown), preferably made of a transparent high density polymer, such as Plexiglas, is placed over the display 10, and the frets F are then mounted on the cover. Alternatively, for retrofitting a preexisting musical instrument, the display could be placed over the fingerboard, optionally with indentations or apertures corresponding to the frets F for receiving the frets F. For a further alternative, a separate neck assembly could be provided on which the display 10 has already been mounted, and this neck assembly could replace the neck of a preexisting guitar.

The display can indicate which of a user's fingers should be placed at particular locations by, for example, assigning numbers to each specific finger, such as is done in conventional guitar tablature, in which "1" is the index finger, "2" is the middle finger, "3" is the ring finger, and "4" is the pinky. This is referred to as finger-specific display of tablature. Thus, the names of chords and the finger-specific tablature for those chords can be simultaneously displayed, together with the names of the individual notes next to the finger positions, which notes are also displayed in their assigned colors, as described below. Of course, other signs and symbols can also be displayed in addition to conventional tablature.

Preferably, the notes would be assigned colors approximately equally spaced along the visible spectrum, so that, for example, A would be red; A# would be brown, B would be orange, C would be yellow, C# would be greenish yellow, D would be green, D# would be greenish blue, E would be blue, F would be indigo, F# would be between indigo and violet, G would be violet, and G# would be reddish purple. This pattern would repeat for each octave. It is also preferred that the user be able to display all notes at once, with their assigned colors and names, so that the user can more easily conceptualize the relationships between notes and finger positions.

Figure 3:
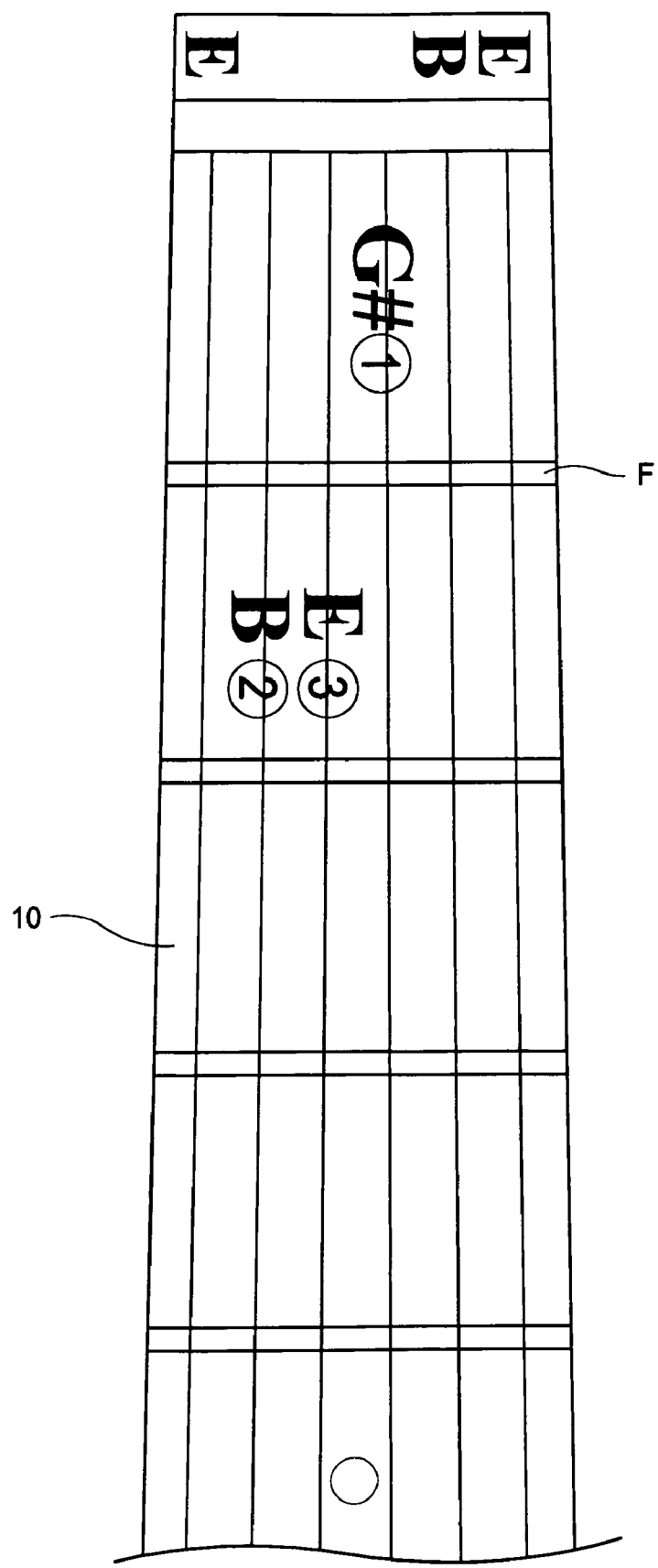
FIG. 3 is a front close-up view of the fingering information shown on FIG. 2.

Referring to FIG. 3, shown is a close-up front view of the device showing alpha-numeric and position information on the display 10, although the display can provide other visual information, such as graphics. The display 10 is depicted as displaying the fingering for a chord and also the names of the notes for that fingering, as well as numbers indicating the specific finger to be placed at each position, as well as the position of that finger. Because this instrument is a fretted instrument, the finger can be placed anywhere behind (that is towards the nut N) the fret adjacent to which the number appears. Other portions of the display 10, either between the frets F or outside the fretted area, can be used to display other information. In FIG. 3, the portion of the display beyond the nut N is indicating the tuning of the open note for the open strings, that is, the note for the string that are not engaged by fingers, so that the entire length of the string between the nut N and the bridge B is free to vibrate.

Figure 4:
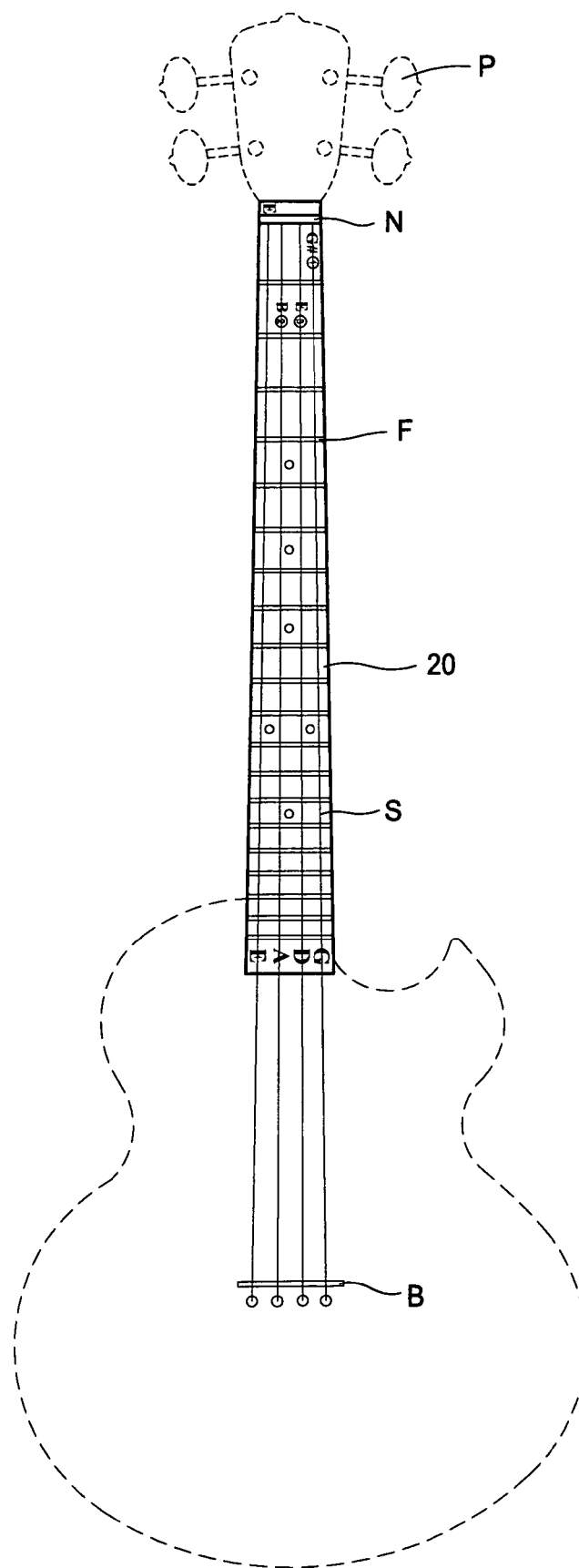
FIG. 4 is a front view of the invention mounted on a four-string fretted instrument, such as an electric bass.

Referring to FIG. 4, shown is an alternative embodiment of the device 20 on a four-stringed fretted instrument, such as an electric bass. Again, the instrument has a body across which strings S are stretched over and above frets F so that the strings are free to vibrate between the bridge B and the nut N, and the strings are tuned by the pegs P.

Figure 5:
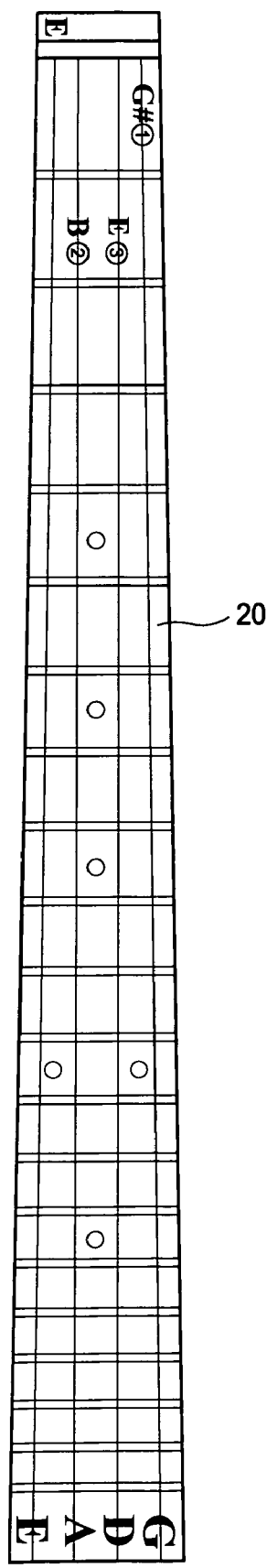
FIG. 5 is a front view of the display of FIG. 4.

FIG. 5 shows the display 20 of FIG. 4.

Figure 6:
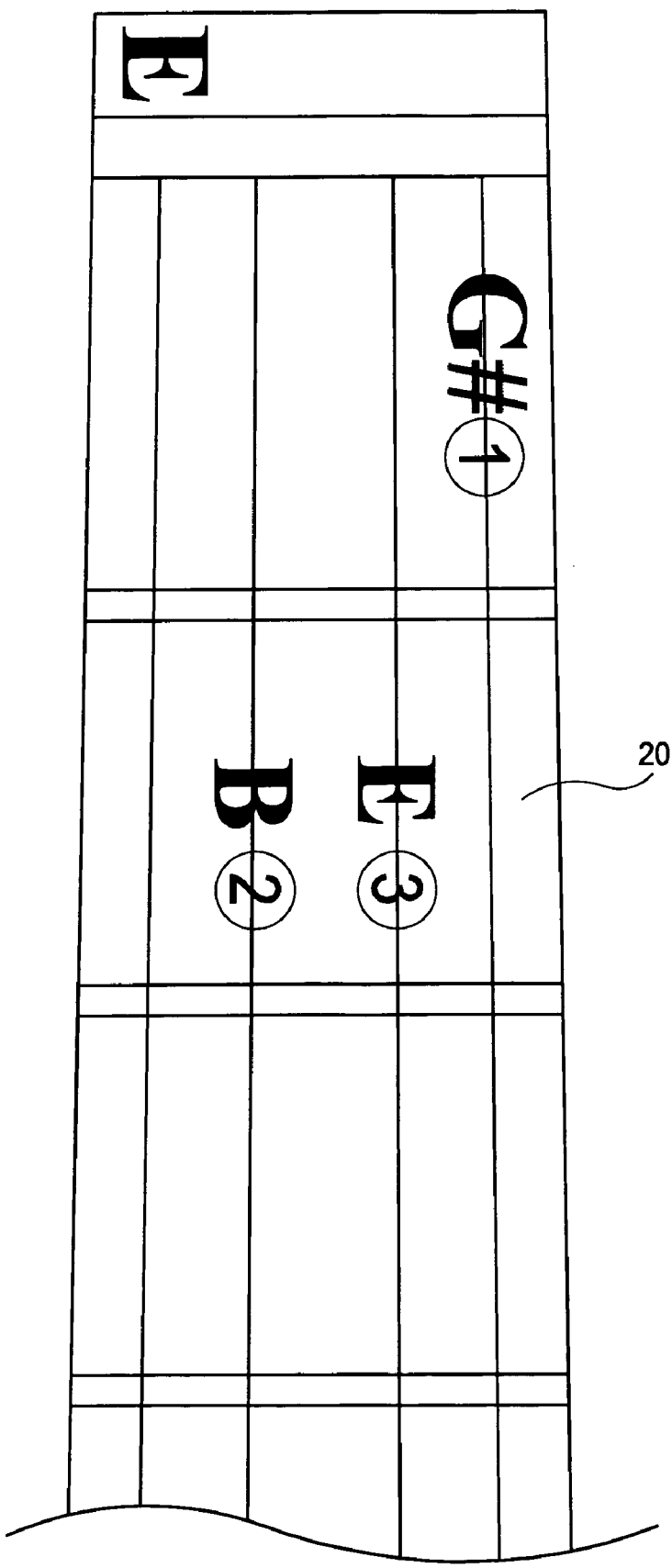
FIG. 6 is a front close-up view of the fingering information shown on FIG. 5.

Referring to FIG. 6, shown as a close-up of a fingering shown on FIG. 5, again with numbers indicating the finger to be placed, the positions of the number indicating the positions where the fingers are to be placed, and the display indicating the note being played by the particular string, again with the open note being designated by the portion of the display beyond the nut N.

Figure 7:
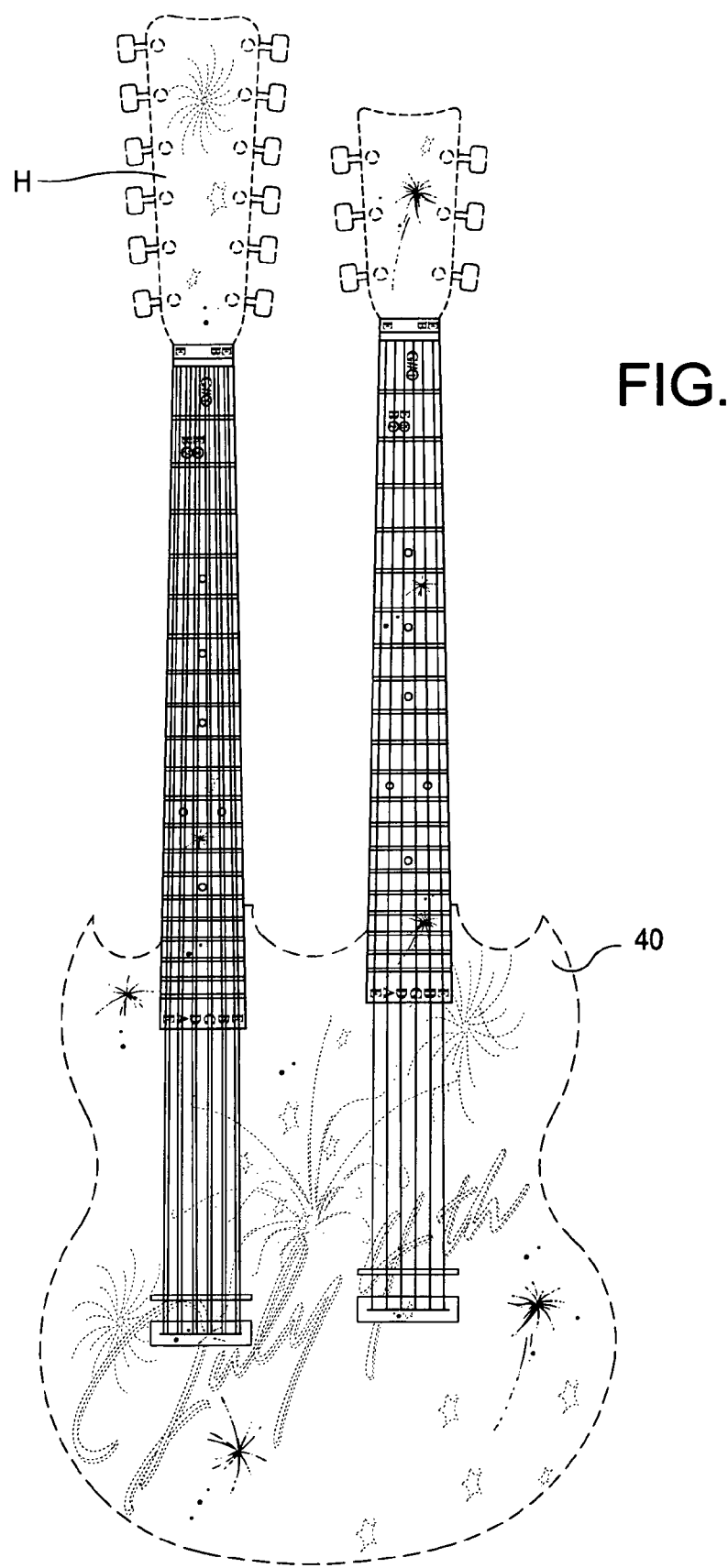
FIG. 7 is a front view of the invention mounted on a two-neck combined six-string and 12-string guitar with the display on the body, the necks and the heads.

Referring to FIG. 7, shown is another alternative embodiment of the device with a display 40 on both the body and necks and the heads H of a double-necked combination 6- and 12 string guitar. The display 40 obviously can be made of multiple portions, some for the body, some for the necks and some for the heads, or can be a single display, as may be desired. As can be appreciated, such a double-necked instrument provides a comparatively large area of the body for displaying graphical and visual information which may include moving and still pictures, lyrics or other visual effects or information. This larger display area can be used advantageously to provide visual effects during the user's performance because visual effects relevant to the song being played can be displayed to an audience. Of course, because the guitar is held by the player, it can be moved to show the graphic display as the player desires. For example, the user can, at the climax of a musical solo, cause the body to show fireworks, with the neck showing rockets moving toward the heads. Similar effects can be provided for other musical instruments that are held while performing, such as portable keyboards.

Applicant is unaware of any prior art that discloses a single dynamic visual display (preferably a polychromatic liquid crystal display) across the entire surface of the fingerboard or body of a musical instrument.

INDUSTRIAL APPLICABILITY

This invention can be used whenever it is desired to provide a learning aid for learning how to play a stringed instrument, a performing aid for providing the user with visual information while performing, or a visual effects aid for showing visual effects while the user is performing.

While the present invention has been disclosed in connection with the presently preferred embodiments described herein, it should be understood that there may be other embodiments which fall within the spirit and scope of the invention as defined by the claims. For example, this invention can be practiced with the visually perceptible portions of a non-portable musical instrument including any or all of the following: displays on keys of a keyboard instrument to indicate which finger and what keys are to be engaged by the user; a display to show the printed music which a user is performing; and/or a display on the portion of the instrument visible to an audience for displaying graphics while performing.

What is claimed is:

1. A musical instrument training system, comprising:
   a musical instrument having a plurality of strings, a fingerboard having an array of finger positions, and a body;
   a single display extending over at least a portion of said fingerboard, wherein said display is capable of simultaneously selectively identifying which of a user's fingers are to be placed at said finger positions to achieve a desired musical effect, and indicating information about said desired musical effect adjacent to said finger positions; and
   a control circuit connected to said display for receiving input signals and for controlling said display in response to said input signals.

2. A musical instrument training system according to claim 1, wherein said display extends over a portion of said body.

3. A system according to claim 1, wherein said display is polychromatic.

4. A system according to claim 3, wherein said display is a liquid crystal display.

5. A system according to claim 1, further comprising a transparent cover over said display.

6. A system according to claim 1, wherein said desired musical effect is selected from the group consisting of chord names, note names, and alternate fingerings.

7. A musical instrument training system, comprising:
   a musical instrument having a plurality of strings, a fingerboard having an array of finger positions, and a body;
   a single display extending over at least a portion of said fingerboard, wherein said display is capable of simultaneously selectively identifying which of a user's fingers are to be placed at said finger positions to achieve a desired musical effect, and indicating information about said desired musical effect;
   wherein said display can also selectively identify positions in addition to said finger positions; and
   a control circuit connected to said display for receiving input signals and for controlling said display in response to said input signals.

8. A musical instrument training system, comprising:
   a musical instrument having a plurality of strings, a fingerboard having an array of finger positions, and a body;
   a single display extending over at least a portion of said fingerboard, wherein said display is capable of simultaneously selectively identifying which of a user's fingers are to be placed at said finger positions to achieve a desired musical effect, and indicating information about said desired musical effect;
   wherein said display can also selectively identify positions in addition to said finger positions, wherein said positions in addition to said finger positions are selected from the group consisting of nodes for harmonics, positions for strumming strings to achieve special effects, positions for plucking strings to achieve special effects and positions for bowing strings to achieve special effects; and
   a control circuit connected to said display for receiving input signals and for controlling said display in response to said input signals.

9. A musical instrument according to claim 1, wherein said musical instrument further comprises a nut and wherein said visual display extends beyond said fingerboard and towards said nut.

10. A musical instrument, comprising:
    a body;
    a fingerboard attached to said body, whereby strings can be attached to said body and to said fingerboard and engaged by fingers of a user at finger positions to create musical notes;
    a visual display extending over at least part of said body, wherein said display is capable of simultaneously selectively identifying which of a user's fingers are to be placed at said finger positions to achieve a desired musical effect, and indicating information about said desired musical effect adjacent to said finger positions; and
    a control circuit connected to said visual display for receiving input signals and for controlling said visual display in response to said input signals.

11. A musical instrument, comprising:
    a body;
    a fingerboard attached to said body that can be engaged at multiple finger positions by fingers of a user;

an audio generator to generate music responsive to engagement of said fingerboard by said fingers;

a visual display located on at least part of said body, wherein said display is capable of simultaneously selectively identifying which of a user's fingers are to be placed at said finger positions to achieve a desired musical effect, and indicating information about said desired musical effect adjacent to said finger positions; and a control circuit connected to said visual display for receiving input signals and for controlling said visual display in response to said input signals.

12. A musical instrument according to claim 11, wherein said audio generator comprises strings extending across said fingerboard and attached to said body.

13. A musical instrument according to claim 11, wherein said audio generator comprises an audio oscillator responsive to positions of said fingers on said fingerboard.

14. A musical instrument, comprising:

a body;

a fingerboard attached to said body;

frets mounted on said fingerboard at positions for creating fundamental musical notes on strings stretched above said fingerboard, whereby a user's fingers can engage said strings at said positions of said frets;

a visual display located on at least part of said fingerboard, wherein said display is capable of identifying which of a user's fingers are to be placed behind said frets to achieve a desired musical note; and wherein said visual display is also capable of identifying positions along said strings other than said frets, whereby said user can achieve musical effects in addition to said fundamental musical notes defined by said frets; and a control circuit connected to said display for receiving input signals and for controlling said display in response to said input signals.

15. A musical instrument, comprising:

a body;

a fingerboard attached to said body;

a visual display located on at least part of said fingerboard, wherein said display is capable of identifying where a user's fingers are to be placed to achieve a desired musical note; and wherein said visual display is also capable of identifying positions along said strings other than positions for creating fundamental musical notes, whereby said user can achieve musical effects in addition to said fundamental musical notes; and a control circuit connected to said display for receiving input signals and for controlling said display in response to said input signals.

* * * * *